June 16, 1959     F. MARTINDELL     2,890,773
CLUTCH-BRAKE MECHANISM

Filed June 5, 1957     4 Sheets-Sheet 1

INVENTOR
FRANK MARTINDELL

ATTORNEY

June 16, 1959
F. MARTINDELL
2,890,773
CLUTCH-BRAKE MECHANISM
Filed June 5, 1957
4 Sheets-Sheet 2
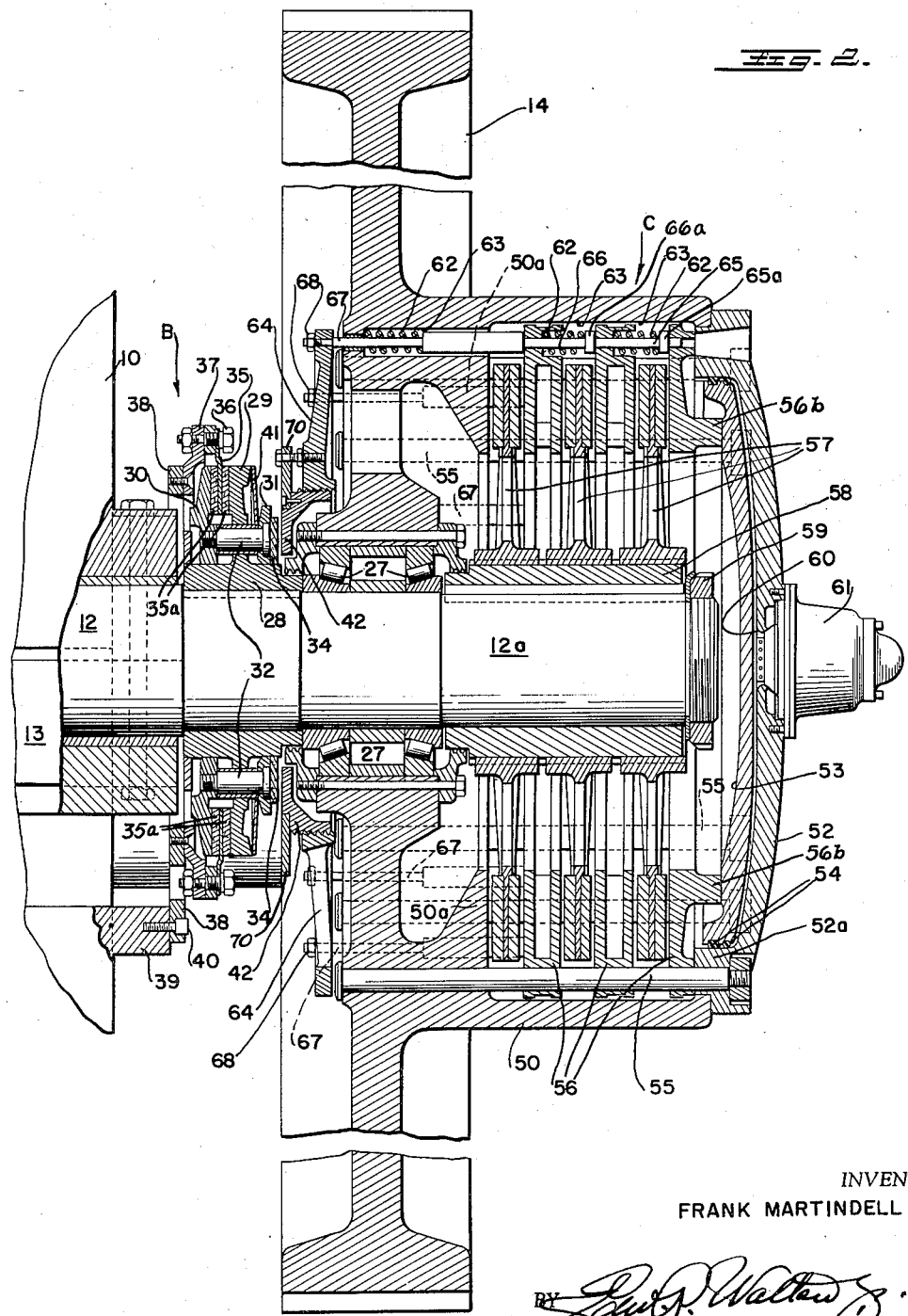
Fig. 2.
INVENTOR
FRANK MARTINDELL
ATTORNEY

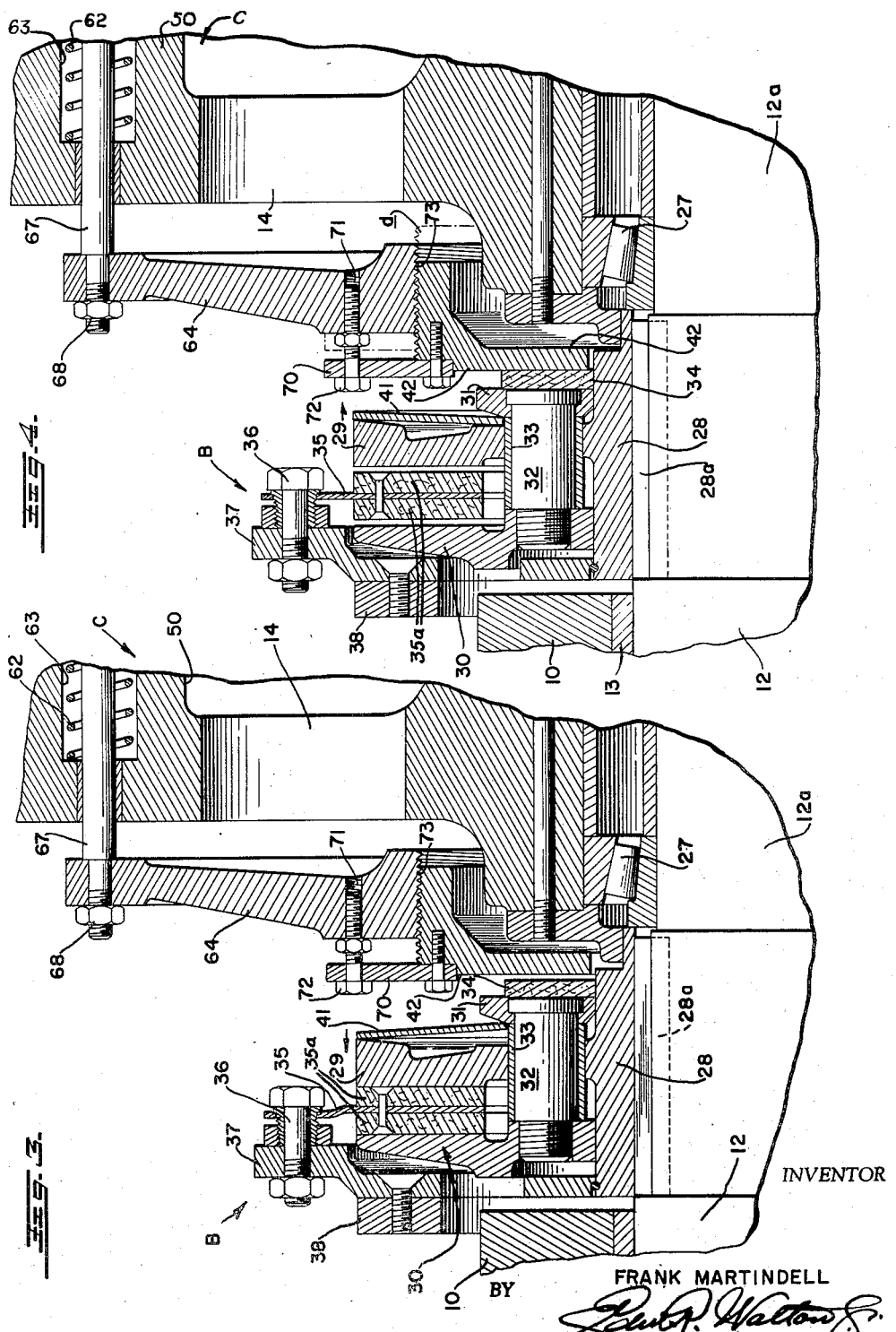

United States Patent Office 2,890,773
Patented June 16, 1959

2,890,773

CLUTCH-BRAKE MECHANISM

Frank Martindell, Bridgeton, N.J., assignor to Ferracute Machine Company, Bridgeton, N.J., a corporation of New Jersey Application June 5, 1957, Serial No. 663,686

7 Claims. (Cl. 192—18)

The present invention relates to improvements in, so-called, mechanically interconnected combined clutch-brake mechanisms usually employed in mechanical presses for heavy-duty metal working.

In certain types of such clutch-brake mechanisms, particularly for heavy-duty presses—where the clutch and brake are mechanically interconnected so that movement of the clutch to engaged position releases the brake and, when the clutch is released, the brake is applied and may assist in the disengaging movement of the clutch and wherein the brake is biased normally to braking position by helical or spiral compression springs and is moved to released position against the bias of such springs by the movement of the clutch to its engaged position—such springs are in a reduced compression when the brake is applied and wear between the braking surfaces causes further loss in spring pressure, thus quickly and continually rendering the brake progressively less effective; and, moreover, during the movement of the clutch to its engaging position, the back pressure of such springs gradually increases against this clutch and is at a maximum pressure against the clutch when and while the clutch is engaged and the brake is fully released, thus imposing a great force in opposition to the engaging movement of the clutch which retards the effective engagement of the clutch of said clutch-brake mechanism. In addition, such arrangement imposes an excessively heavy load or force upon the bearings of a driving pulley-flywheel or driving gear journalled on a shaft supporting said mechanism, at the time said springs are being compressed against their bias to release the brake while the clutch is being engaged, thus accelerating the wear on and attrition of said bearings.

I have discovered that the condition above enumerated may be avoided in a manner that is not only simple and less costly in manufacture of and in the maintenance of clutch-brake mechanisms of heavy-duty presses, but assures greater efficiency in the operation of both the brake and the clutch by providing a spring force that is at the peak of its pressure, when the brake is applied, and which pressure is progressively reduced from its maximum during the period when the clutch is moved to engaged position and to release the brake before the clutch reaches its fully engaged position.

Therefore, it is the aim and object of this invention to overcome the deficiencies or drawbacks mentioned by incorporating a Belleville spring in the brake of such an interconnected clutch-brake mechanism, in place of helical or spiral springs and the like; and by taking advantage of the pressure characteristics of such a spring in a very simple arrangement, the brake is applied under the maximum pressure of the spring and the movement of the clutch to release the brake and engage its parts is performed under a progressively and substantially decreased pressure of said spring.

A further object of this invention is to provide a safety arrangement in the interconnection between the clutch and brake, whereby, should the connection fail, it allows the brake to remain applied or, if the brake is partially or fully released at the time of such failure, the brake will be applied instantly, thus stopping the press or other mechanism.

To attain these objects, as well as other objects as will appear from the following detailed description, the invention consists in the features of novel construction, combination and arrangement of parts hereinafter more fully described and claimed.

In the drawings, which show, by way of example, one embodiment of the invention as at present devised:

Figure 2 is an enlarged vertical sectional view through the clutch-brake mechanism shown at the right-hand side of the press in Figure 1;

Figure 3 is an enlarged fragmentary view of the improved brake in its applied or braking position and of its associated actuator actuated by said clutch when the clutch is disengaged;

Figure 5:
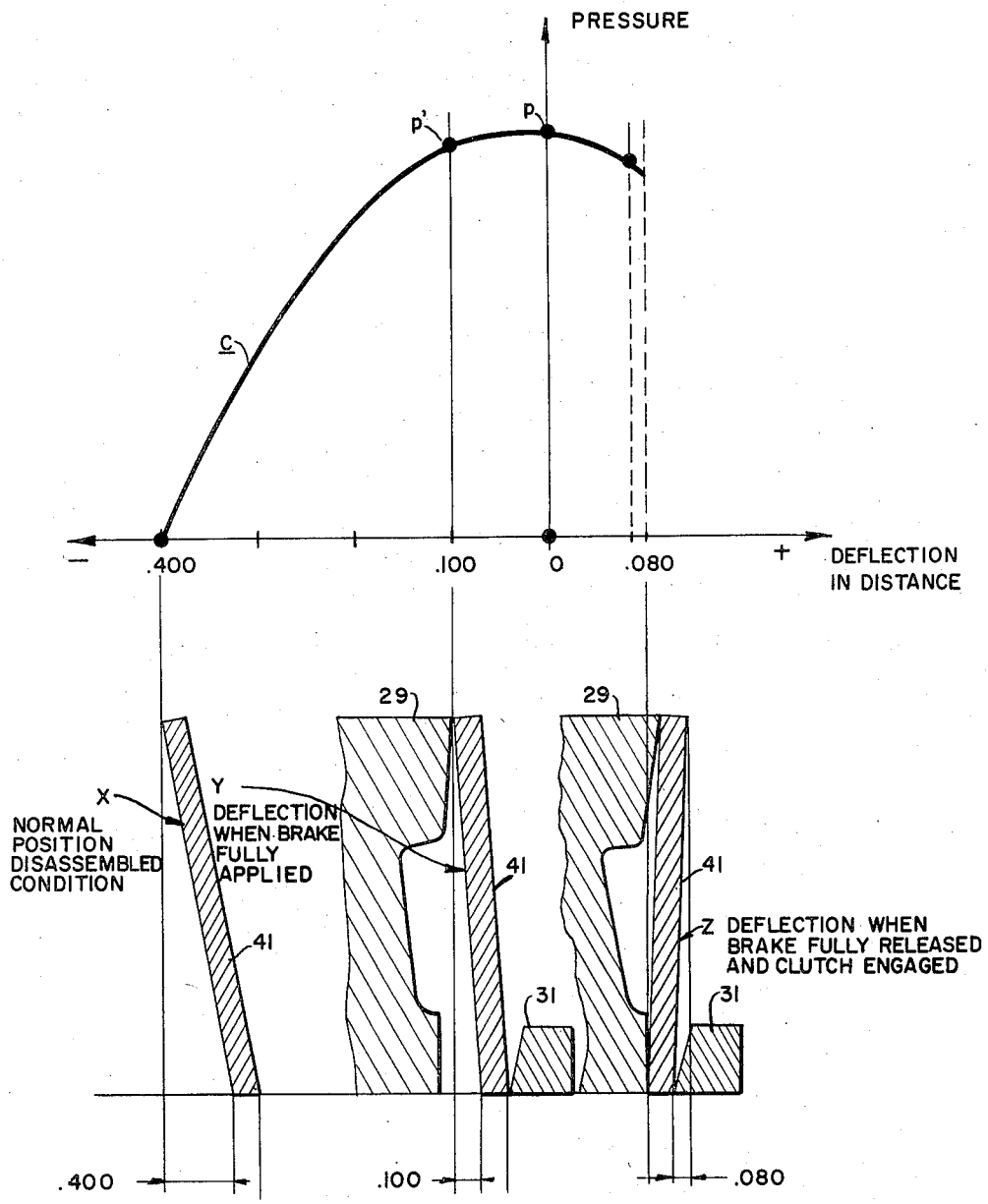

Figure 4 is a view similar to Figure 3 but showing the brake in its released position as actuated by said clutch when the clutch is engaged; and illustrating in dotted lines the manner in which the collar is actuated, upon failure of its locking devices, to allow the brake to remain or become applied; and Figure 5 is a schematic diagram illustrating, in accordance with the present invention, the deflection of the Belleville spring in its several positions and in relation to its approximate pressure curve.

Figure 1:
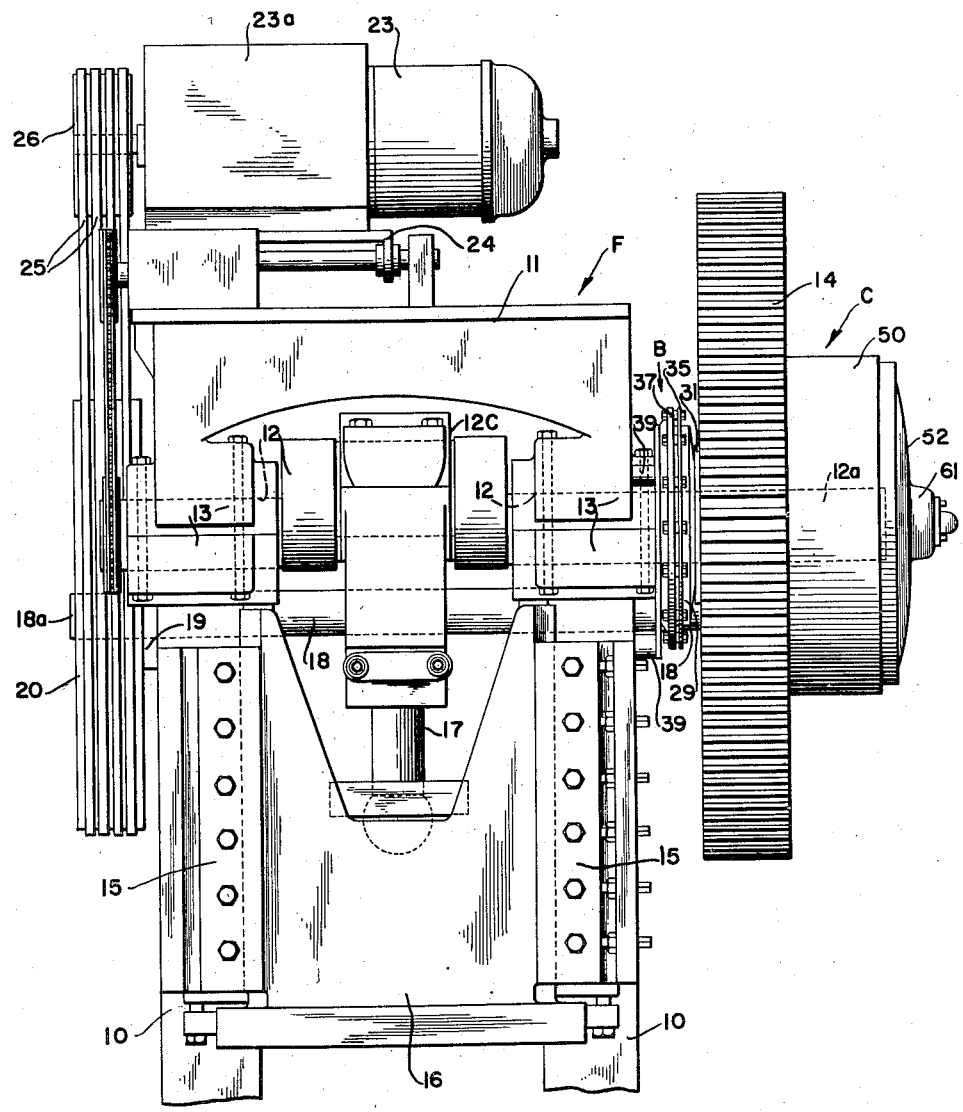
Figure 1 is a front elevational view of the upper portion of one form of press having a clutch-brake mechanism applied thereto in accordance with this invention.

With reference to Figure 1, the clutch-brake mechanism C—B of this invention is shown, for purposes of illustration only, as applied to a press having a C-type frame F including spaced vertical side members 10 terminating at their upper ends in a horizontal connecting head 11 forming a forward or overhanging portion in which a driven crank-shaft 12 is journalled in suitable bearings 13 with the crank portion 12c positioned between the frame members 10 and with one end of the crank-shaft projecting for a distance beyond the frame to support a driving gear 14 and said clutch-brake mechanism.

Above the bed or entablature of the press (not shown), the frame members 10 are provided with guides 15 in which a ram 16 is reciprocated vertically by a pitman 17 connecting the ram with the crank 12c. The crank-shaft 12 is driven by a back shaft 18 journalled in bearings 19 mounted on the frame members 10. A pulley 20 is keyed on one end 18a of the back shaft 18 and a pinion (not shown) is keyed on the other end of said shaft and meshes with the driving gear 14. The pulley 20 is operatively connected with a source of power such, for instance, as an electric-motor-gear reduction unit 23 mounted on a suitable platform 24 supported on the head 11. A belt 25 passes over a pulley 26 carried on the gear reduction unit 23a to the pulley 20.

The parts of the press, to which reference has just been made, may be of any desired construction or arrangement suitable for its purposes and with which the present invention may be employed.

The clutch-brake mechanism C—B is mounted on one end of the shaft 12, as more particularly shown in Figures 1 and 2, and is here shown as having the brake B disposed between the driving gear 14 and the frame of the press, and the clutch C as being disposed on the other side of the gear 14 at the end of the shaft.

With particular reference to Figures 2, 3 and 4, the gear 14 is the driving element of the clutch-brake mechanism and is rotatably mounted on the extension 12a of the crank-shaft 12 by means of a thrust bearing 27, and the crank-shaft 12 is the driven element of the clutch, Instead of the gear 14, a pulley-flywheel may be employed where necessary or desirable.

The brake assembly B comprises a hub 28 mounted on and keyed, as at 28a, to the shaft 12 immediately adjacent the frame member 10. The hub 28 has a radially and circumferentially extending brake plate 29 fixed thereon, and preferably integral therewith, and positioned substantially medially thereof. An annular complemental brake plate 30 is fitted slidably on the circumferential surface of the inner end of the hub 28 (i.e., adjacent the frame 10) for axial movement thereon and is connected to an annular thrust-receiving collar 31, slidably surrounding the other or outer end of the hub, by a circumferential series of spaced bolts 32 extending from the inner circumferential marginal portion of the slidable brake plate 30. The bolts 32 are headed at one end and have reduced threaded portions at their other ends, their headed ends being received in counter-bores in the thrust-receiving collar 31 and their threaded ends being threaded into the slidable plate 30. The intermediate portion of each of said bolts may be surrounded by a spacing and bushing sleeve 33.

A non-rotating brake disc 35, preferably of the flexible and detachable sectional type, is disposed between the brake plates 29 and 30 so that, when the brake plates are forced toward each other, they will engage and grip the brake disc 35 to apply the brake. The inner marginal portion of the brake disc 35, which extends between the brake plates, is preferably faced with brake linings 35a, and its outer marginal portion is secured at intervals, by suitable bolt means 36, to a brake ring 37 which is secured—either directly or by means of an intermediate mounting ring 38—to bosses 39 integral with and spaced on the frame 10 of the press, by means of a series of spaced screws 40.

According to the present invention, the slidable brake plate 30 is normally urged toward the fixed or integral brake plate 29, to firmly grip and bind the brake disc 35 therebetween, by a biasing force generated by a Belleville spring designed and so disposed that the spring is at the peak or crest of its pressure curve when the brake is applied; and, conversely, when the clutch is operated to engaged position and to shift the brake plate 30 so as to release the brake, this pressure of the spring is progressively reduced by deflecting said spring reversely past its peak of maximum pressure and against its tensional stresses, this progressive reduction of pressure continuing during the period when the clutch is closing and before the clutch reaches its fully engaged position.

The presently preferred manner of accomplishing this is shown in Figures 2, 3 and 4, wherein the Belleville spring 41 is an annulus surrounding the hub 28 with its inner circumferential edge resting on the sleeve bushings 33 (see Figs. 3 and 4) and its inner marginal portion abutting against the inner face of the thrust-receiving collar 31 and with its outer marginal portion bearing against the outer marginal edge portion of the fixed brake plate 29, which acts as a fixed fulcrum point. Other arrangements of the spring 41 are broadly within the purview of this invention which function in the manner set forth herein; however, the arrangement shown is extremely simple and inexpensive and permits quick and easy replacement or adjustment of the spring 41.

For a better understanding of the action of the Belleville spring 41 as employed according to this invention, c in Figure 5 generally indicates the pressure curve characteristics of the spring in its several positions and wherein X indicates the negative deflected position of its body portion when the spring is in its free or unassembled condition. When assembled in the brake B and in its normal brake-engaging position, the inner circumferential portion of the spring 41 has been deflected toward the plane of its outer circumferential edge, as indicated by Y, which tends to straighten or flatten the entire body of the Belleville spring to place it at, or substantially at, the peak of its pressure curve c. This positioning Y of the Belleville spring 41 may be obtained and maintained by the selection of sleeve-bushings 33 of the proper length or by shimming between the inner circumference of the spring 41 and the thrust-receiving collar 31 when excess wear has occurred between the braking surfaces but before said surfaces need replacement. In brakes of presses having new frictional linings or faces 35a, the position Y of the spring 41 is set substantially coincident with the top point p of its pressure curve to fully apply the brake and, as the braking linings compress, after their initial operation, the spring may assume an extreme position substantially indicated at Y and at p' on the pressure curve c.

When the clutch C is initially operated to engaged position, it shifts a thrust-collar 42 to the left, in Fig. 3, which, in turn, shifts the thrust-reeciving collar 31 to the left from its position in Fig. 3, which movement simultaneously shifts the slidable brake plate 30 and the inner circumferential edge of the annular spring 41 in the same direction, to release the brake against the biasing force of said spring 41, as shown in Fig. 4. The initial movement of the spring 41, by the movement of the thrust collar 42, causes the spring 41 to deflect reversely to the right from its normally deflected position Y beyond its top point p to the position shown in Fig. 4 and as indicated at Z in Fig. 5. Thus, the spring pressure is gradually reduced during the closing or engaging movement of the clutch and less pressure is subtracted or absorbed from the pressure closing the clutch C and holding it fully engaged, than at the start of the release of the brake. A washer 34 of frictional material is interposed between the thrust-receiving collar 31 and the thrust-collar 42 to act as a wear-plate.

When the thrust-collar 42 has been withdrawn, from its position shown in Fig. 4, to the right, as shown in Fig. 3 by the disengagement of the clutch C the rebounding resiliency of the Belleville spring 41 to assume its normal position (shown in Fig. 3 and at Y in Fig. 5) reacts upon the inner face of the thrust-receiving collar 31 to shift the bolt 32 to the limit of its movement to the right, as shown in Fig. 3, and, hence, forcefully moves the brake plate 30 into braking relation with the brake plate 29 and brake disc 35 and holds the brake B applied under the compression force of said spring 41. When the annular Belleville spring 41 has assumed the position shown in Fig. 3 and at Y in Fig. 5, it is within the crest of its pressure curve and exerts its full force upon the braking surfaces. The parts are so dimensioned and arranged that the zone of wear between the braking surfaces straddles the peak points p and p' of the Belleville spring pressure curve, making the brake adjustment more stable during the wear of the braking surfaces 35a.

As previously stated, the clutch C may be mounted on the outer extremity of the projected end 12a of the crank-shaft 12 and comprises a sleeve housing 50 concentric with the end 12a of said shaft and carried by or projecting from the driving gear 14 and has a fixed inner wall 50a. The outer end of the sleeve housing 50 is closed by a removable wall member 52 somewhat dished or concaved on its inner face and rimmed by an inwardly extending lateral flange 52a forming a relatively short cylindrical wall in which a plate-like piston 53 operates, a sealing ring 54 being provided at the peripheral edge of the piston to contact the cylindrical wall. The end wall 52 is removably held firmly in position by a series of circumferentially spaced stay-rods 55 extending therefrom through openings in the gear 14 and having intermediate portions thereof exposed within the housing 50.

One or more annular clutch driving plates 56 are disposed within the housing 50 circumferentially of the shaft 12 and are slidably mounted on the exposed portions of the stay-rods 55 between the piston 53 and the inner wall 50a of the housing 50.

The driven members of the clutch C are annular discs 57 splined upon a hub 58, the hub being keyed on the shaft extension 12a and held in place by the lock nut 59, there being a required number of the clutch discs 57 so that one will be interposed between adjacent surfaces of the clutch plates 56.

The outermost of the annular clutch plates 56 is provided at its inner circumference with an outwardly projecting flange or abutment 56b to normally contact the inner face of the piston 53, whereby, when compressed air is admitted through a port 60, controlled by a valve means 61 in the end wall 52, the piston 53 will move to the left in Figures 2, 3 and 4, firmly pressing the slidable clutch-plates 56 and the clutch discs 57 together against the fixed inner wall 50a, thus engaging the clutch assembly. When the air pressure is relieved, it escapes through the port 60, allowing the clutch to disengage and, when so disengaged, helical compression springs 62 separate the clutch plates and discs to provide a running clearance, thus eliminating undue heating by friction.

The springs 62 are arranged in sets in retaining pockets 63 disposed in a spaced circumferential series about the peripheral edges of the clutch plates 56 and the fixed inner wall 50a of the housing 50; and each set of springs is carried by and surrounds an individual push-rod, which push-rods are in end-to-end alignment to actuate an annular push-plate 64 that surrounds the shaft 12 and shifts the thrust-receiving collar 31 of the brake assembly B, when the clutch C is being engaged, to move the brake-plate 30 to disengage the brake. Each push-rod 65, between the outermost removable clutch-plate 56 (that engages the piston 53) and the next adjacent clutch-plate, has one end slidably mounted in an opening extending axially in said plate and provided with an enlargement or abutment collar 65a that is held against said plate by its spring 62; and each has its other end slidably mounted in a corresponding opening in the next adjacent slidable clutch-plate 56 (if there is more than one provided) to engage and abut the end 66a of the next push-rod 66 of the set and, in turn, each push-rod 66 will abut a push-rod 67. The push-rods 67 have their outer ends extending slidably through the gear 14 and fixedly connected, as at 68, to the push-plate 64, thereby supporting it in position.

The inner circumference of the annular push-plate is internally threaded and has the externally threaded abutment or thrust collar 42 carried therein so as to be threadedly adjustable toward and from the opposing frictional wear-washer 34 of the thrust-receiving collar 31. The thrust-collar 42 is provided with a radial outwardly extending flange 70 provided with a number of circumferential bolt holes in its peripheral marginal portion spaced apart to correspond to a .005 of an inch threaded adjustment of the thrust collar 42 in the push-plate 64 with respect to the thrust-receiving collar 31, allowance being made for the wear-washer 34 interposed therebetween and any wear of the wear-washer 34 that has occurred. Three equally spaced threaded openings 71 are provided in the push-plate and positioned to align with the openings in the flange, through which openings in the flange and push-plate, a bolt 72 is inserted to hold the parts in their adjusted position.

Since the proper functioning of the brake assembly B depends upon maintaining a correct clearance between the thrust-collar 42, the thrust-receiving collar 31 and the interposed wear-washer 34—which more especially occurs when and as the wear-washer 34 wears by friction—it is only necessary to remove the locking bolt or screw 72 and then turn the thrust-collar 42 until the required running clearance is restored. This adjustment can be readily made when the press is stopped.

While this adjustable construction just stated, permits the maintenance of the proper clearance between the collars 31 and 42, which has been generally advantageous in the clutch-brake mechanism herein described, it has been nevertheless the occasion of failure of the mechanism when proper attention has not been given to it in order to maintain the required proper clearance and when standard practice has been followed in providing the mating threaded connection 73 between the push-plate 64 and the thrust-collar 42, which practice is to thread said parts so that the thrust collar 42 is fed outwardly from the push-plate 64 toward the thrust-receiving collar 31—i.e., to the left in Figs. 3 and 4—when the push-plate is rotating with the flywheel or gear 14 in its normal direction of rotation and the collar 42 is in binding engagement with the thrust collar 31 and its wear-washer 34 with the brake B applied.

This failure has occurred when defective brake linings were inadvertently employed or the user has neglected to maintain the proper space adjustment between the thrust collar 42, the wear-washer 34 and the thrust-receiving collar 31, so that said spacing is diminished to zero. When such failures have occurred, the clutch and brake work against themselves and, since the brake is applied and stationary and the clutch mechanism is rotating with the gear 14 with the parts 31, 34 and 42 in binding engagement, there is a tendency for the push-plate 64 to "wind up" on the thrust-collar 42, elongating the entire mechanism from the cylinder head 52 to the outside portion of the brake B, with the result that the brake might release, while the clutch is still engaged, by this strain or force distorting or breaking the lock-bolt 72 and allowing the thrust collar 42 to unscrew or feed out of the push-plate 64 (to the left in Figs. 3 and 4), thus moving the collar 31 to release the brake; and, should the clutch be still engaged, an accident may occur to the operator of the press, in addition to deforming or otherwise damaging the clutch-brake mechanism.

According to this invention, the probability of an accident is materially reduced, if not eliminated, by causing the thrust-collar 42 to shift or move in a direction away from the thrust-receiving collar 31 and its washer 34, that is, inwardly of the push-plate or spider 64, when such conditions obtain as just mentioned. This may be accomplished in a very simple way by having the screw-threads 73 positioned or directed so that the occurrence of the binding engagement between the parts 31, 34 and 42, when the clutch is engaged and the brake applied, will cause the thrust-collar 42 to screw or feed inwardly into the central threaded opening of the annular push-plate 64, as indicated in dot-and-dash lines at d in Fig. 4, for a sufficient distance or amount to at least relieve the binding between the parts 31, 34 and 42 and to allow the brake to remain applied or to apply itself thus stopping the press. Consequently, the screw threads 73 must be left-hand threads, when a push-plate 64 is mounted for counterclockwise rotation, and must be right-hand threads, when said push-plate 64 is mounted for clockwise rotation.

The shifting of the collar 42 to the dot-and-dash line position, shown in Fig. 4, may result in the shearing of or the tearing loose of the lock-pin or screw 72 and, at most, the distortion of the ring 70 and of the spider or push-plate 64, but greater damage to the clutch-brake mechanism will be avoided and the likelihood of injury to the operator of the press will be eliminated.

From the above, it will be observed that the improvements described and shown herein attain the objects of this invention above set forth.

Having thus described the invention and the manner in which the same is to be performed, it is to be understood that the exact construction herein shown and described may be varied or modified within the spirit and scope of the appended claims; and that the invention is not to be limited to the exact construction shown herein, but only by the scope of the appended claims.

That which is claimed, as new and to be secured by Letters Patent is:

1. The combination with a combined clutch-brake mechanism which includes a driving member and a driven member, relatively separable clutch parts connecting said members, a brake assembly for the driven member having relatively separable brake elements, means for moving said clutch parts into and out of clutching engagement including a movable mechanical part arranged to actuate the brake assembly for releasing said braking elements during the movement of said clutch parts into clutching engagement; of a Belleville spring means assembled relatively to said brake parts in a deflected position to normally lie in the crest of its maximum to force said brake elements into braking engagement, when said clutch parts are disengaged, and to be deflected reversely from its peak of maximum pressure to progressively reduce the pressure of said spring as the clutch parts are being moved into clutching engagement and to release said brake elements, said spring being self-rebounding to its said normal position to force said brake elements into braking engagement, when said clutch parts are declutched.

2. In a combined clutch-brake mechanism, the combination of a driving member and a driven member, clutch parts positioned for connecting and disconnecting said members, a brake assembly adapted to be connected to a stationary part and positioned for stopping and releasing the driven member and having relatively movable brake elements including a Belleville spring assembled relatively to said elements in a position deflected from its zero pressure position and lying normally in the crest of its pressure curve at the upward side of its maximum pressure point to yieldably urge said brake elements into braking engagement, means for moving said clutch parts into and out of clutching engagement, and shiftable means movable by the movement of said clutch parts and positioned to shift the movable brake elements to non-braking position against the pressure of said spring and to deflect said spring to the other side of its maximum pressure point, when said clutch parts are being moved to engagement, whereby the pressure of the spring reacting against the engaging movement of the clutch parts is continually reduced as said spring deflects from its peak of maximum pressure and whereby said spring is in its maximum pressure when the brake is applied.

3. In a combined clutch-brake mechanism, the combination of a driving member and a driven member, clutch parts positioned for relative axial movement for connecting said members and normally biased to disengage, a brake assembly having relatively shiftable and non-shiftable elements positioned axially of said driven member and of said clutch parts, an annular Belleville spring coaxially disposed in said brake and deflected from its zero position to normally lie in the crest of its pressure curve with its outer peripheral portion bearing upon a non-shiftable brake element and its inner peripheral portion bearing against a shiftable brake element for yieldably urging said brake elements into braking engagement, a thrust collar positioned between said clutch parts and said shiftable brake element coaxially thereof and connected with the shiftable clutch parts and positioned to be normally out of contact with the shiftable brake elements, when said clutch parts are disengaged, and means for moving said clutch parts into clutching engagement and for moving said thrust collar into abutting contact with and shifting said shiftable brake elements to separate the latter against the pressure of said spring and to deflect said spring reversely beyond its point of maximum pressure, whereby the pressure of the spring reacting against the engaging movement of the clutch parts is continually reduced as said spring deflects from its peak of maximum pressure.

4. In a combined clutch-brake mechanism, a driven shaft and a driving member therefor journalled on said shaft; a clutch including parts coaxial of said shaft for connecting said members, means normally biasing certain of said clutch parts to non-clutching position; a brake assembly including annular brake elements coaxial of said shaft, certain of said elements being fixed and rotatable with said shaft and certain other of said elements being shiftable axially of said shaft and held stationary against rotation, a thrust-receiving collar surrounding said shaft between said clutch and said fixed brake element and movable axially thereof, means connected to and movable with said thrust-receiving collar and positioned to shift said shiftable brake element into and out of braking engagement, an annular Belleville spring disposed coaxially of said shaft with its outer peripheral portion bearing upon said fixed brake element and its inner peripheral portion bearing against said thrust-receiving collar, said spring being deflected from its zero pressure position to normally lie in the crest of its pressure curve to one side of its maximum pressure point to yieldably urge said brake elements into braking engagement; a thrust collar positioned coaxially of said shaft between said clutch and said thrust-receiving collar and connected with said biased clutch parts to move therewith out of contact with said thrust-receiving collar, when said clutch parts are disengaged, and to contact and shift said thrust-receiving collar to release said brake against the pressure of said spring and deflect said spring to other side of its maximum pressure point during the movement of said clutch parts to their engaged position, whereby the pressure of the spring reacting against the engaging movement of the clutch parts is continually reduced as said spring deflects reversely from its peak of maximum pressure.

5. In a brake mechanism for a rotating shaft, a brake assembly comprising relatively separable coacting brake plates surrounding said shaft, at least one of which is fixed upon and rotates with the shaft and at least another of which is shiftable axially of said shaft and still another of said plates being held against rotation and positioned between said other plates, connecting means projecting axially from the shiftable plate and slidably extending through transverse openings in the fixed plate, a thrust-receiving collar connected to the extended ends of said connecting means and surrounding said shaft, an annular Belleville spring disposed coaxially of the shaft with its outer peripheral portion bearing upon said fixed rotatable plate and its inner peripheral portion bearing against the inner face of said thrust-receiving collar, said spring being deflected from its zero pressure positioned to lie normally in the crest of its pressure curve to one side of its maximum pressure point to yieldably urge said shiftable brake plate toward said other of said brake plates into braking engagement, and means for applying a thrust to the outer face of said thrust-receiving collar to shift the shiftable brake plate against the pressure of said spring and to deflect said spring to the other side of its maximum pressure point, whereby the pressure of the spring is continually reduced as the spring deflects reversely from its peak of maximum pressure during the releasing movement of said shiftable brake plate.

6. In a clutch-brake mechanism, a rotatable shaft, a clutch on said shaft including a driving member and a driven member fast on the shaft, at least one of said members being shiftable axially of the shaft to engage and disengage said clutch, means biasing said clutch members normally to disengage, means for actuating said clutch members to engaged position against their bias, an annular push plate substantially coaxial of the shaft and connected with the shiftable clutch member to shift therewith, a thrust collar threaded into the inner circumference of said push plate, means for holding said thrust collar in adjusted position on the push plate, a brake assembly on said shaft in juxtaposition with said thrust collar and including braking disc elements coaxially of the shaft and shiftable axially of the shaft relatively to each other, one of said discs being fast on the shaft, means for biasing said braking discs into braking position, a thrust-receiving collar connected with said discs and positioned in normal spaced opposition to said thrust collar, when said clutch is in its disengaged position, and to be contacted by said thrust collar, when the clutch is being moved to clutching position, to shift the brake discs to non-braking position, the threads between said thrust collar and said push plate being pitched to allow the thrust collar to rotate inwardly of the push plate and away from said thrust-receiving collar when said clutch and brake are both engaged and the thrust collar and the thrust-receiving collar are in gripping or forced contact, due to a maladjustment of said thrust collar caused by wear on the clutching or braking surfaces, or both.

7. A safety device for combined clutch-brake mechanism of presses, which mechanism includes a brake normally biased to braking position and having an abutment member shiftable axially in relation to the brake and operable to release said brake, a clutch normally biased to disengaged position, a thrust collar carried by the biased element of the clutch for movement therewith and threadedly mounted axially thereof, said thrust collar being positioned in spaced opposition to said abutment member to contact and shift said abutment member, when the clutch is moved to clutching position, and being threadedly adjustable in its mounting relatively to said abutment member to maintain a proper clearance therebetween when the clutch is disengaged, and means for holding said thrust collar in adjusted position; the improvement comprising the said thrust collar being arranged and mounted to cause the thrust collar to shift axially away from said abutment member, when said clutch and said brake are both engaged and said thrust collar and abutment member are in gripping or forced contact and working against each other, thereby to cause the brake to become effective to stop the press without material damage to said mechanism and injury to attendants.

References Cited in the file of this patent

UNITED STATES PATENTS

| | | |
|---|---|---|
| 2,095,816 | Johansen | Oct. 12, 1937 |
| 2,108,059 | Glasner | Feb. 15, 1938 |
| 2,159,326 | Harwood et al. | May 23, 1939 |
| 2,585,234 | Eason | Feb. 12, 1952 |
| 2,728,252 | Connell | Dec. 27, 1955 |
| 2,838,150 | Eason | June 10, 1958 |

FOREIGN PATENTS

| | | |
|---|---|---|
| 945,201 | Germany | July 5, 1956 |